United States Patent
Elkin et al.

(10) Patent No.: US 10,714,846 B2
(45) Date of Patent: Jul. 14, 2020

(54) ELECTRICAL CONNECTION OF ELEMENTS INSIDE THE CHAMBER OF A NUCLEAR FUSION REACTOR TO THE REACTOR VESSEL

(71) Applicant: STATE ATOMIC ENERGY CORPORATION "ROSATOM" ON BEHALF OF THE RUSSIAN FEDERATION, Moscow (RU)

(72) Inventors: Vladimir Nikolaevich Elkin, Moscow (RU); Sergey Viktorovich Makarov, Moscow (RU); Konstantin Sergeevich Skladnov, Moscow (RU); Vladimir Ur'evich Kolganov, Moscow (RU)

(73) Assignee: STATE ATOMIC ENERGY CORPORATION "ROSATOM" ON BEHALF OF THE RUSSIAN FEDERATION, Moscow (RU)

( * ) Notice: Subject to any disclaimer, the term of this patent is extended or adjusted under 35 U.S.C. 154(b) by 8 days.

(21) Appl. No.: 16/074,745

(22) PCT Filed: Jan. 19, 2017

(86) PCT No.: PCT/RU2017/000022
§ 371 (c)(1),
(2) Date: Aug. 1, 2018

(87) PCT Pub. No.: WO2017/135844
PCT Pub. Date: Aug. 10, 2017

(65) Prior Publication Data
US 2019/0074608 A1 Mar. 7, 2019

(30) Foreign Application Priority Data
Feb. 1, 2016 (RU) .................. 2016103210

(51) Int. Cl.
*G21C 13/032* (2006.01)
*H01R 4/58* (2006.01)
(Continued)

(52) U.S. Cl.
CPC .................. *H01R 4/58* (2013.01); *G21B 1/13* (2013.01); *G21B 1/17* (2013.01); *H01R 13/02* (2013.01);
(Continued)

(58) Field of Classification Search
CPC .......... H01R 4/00; H01R 4/58; G21C 13/032; G21C 13/036; G21B 1/13; G21B 1/17
See application file for complete search history.

(56) References Cited

U.S. PATENT DOCUMENTS 5,975,410 A * 11/1999 Slattery .................... C25D 1/00
228/175
2003/0100205 A1  5/2003 Daume
(Continued)

FOREIGN PATENT DOCUMENTS

| EP | 1664359 A1 | 6/2006 |
| JP | H06204689 A | 7/1994 |

(Continued)

OTHER PUBLICATIONS

Poddubnyi, I., et al. "Electrical connectors for blanket modules in ITER." Fusion Engineering and Design 89.7-8 (2014): 1336-1340. <https://www.sciencedirect.com/science/article/pii/S0920379614001392>. (Year: 2014).*

(Continued)

*Primary Examiner* — Lily C Garner
(74) *Attorney, Agent, or Firm* — Dentons US LLP

(57) ABSTRACT

The invention relates to the field of thermonuclear fusion and can be used in devices for electrically connecting internal elements of the reactor chamber to the vacuum
(Continued)

vessel of the nuclear fusion reactor. The present device for electrically connecting elements inside the chamber of a reactor to the vacuum vessel of the nuclear fusion reactor comprises lamellar electrically conductive elements with surface portions oriented in different directions, said elements being stacked between flanges. The device is made as an integral unit, where profiled slots are formed with connecting walls therebetween. The connecting walls constitute the electrically conductive elements and have profiled sections of an increased thickness between the differently oriented surface portions at transition areas to the flanges provided at the end parts of the integral unit. The technical effect of the present invention is an increase in the cyclic strength of the electrically conductive elements at the transition areas between the elements and the flanges and between the differently oriented surface portions (at bends) of the elements. The invention also provides that the electrically conductive elements have similar technical characteristics.

4 Claims, 2 Drawing Sheets

(51) Int. Cl.
*G21B 1/17* (2006.01)
*G21B 1/13* (2006.01)
*H01R 13/02* (2006.01)
*H01R 13/00* (2006.01)
*H01R 4/00* (2006.01)
*G21C 13/036* (2006.01)

(52) U.S. Cl.
CPC ......... *G21C 13/032* (2013.01); *G21C 13/036* (2013.01); *H01R 4/00* (2013.01); *H01R 13/00* (2013.01)

(56) References Cited

U.S. PATENT DOCUMENTS

| | | |
|---|---|---|
| 2011/0216866 A1 | 9/2011 | Pearson |
| 2015/0340105 A1 | 11/2015 | Goldberg |

FOREIGN PATENT DOCUMENTS

| | | |
|---|---|---|
| JP | 2010080574 A | 4/2010 |
| RU | 2335554 C2 | 10/2008 |
| RU | 118100 U1 | 7/2012 |
| RU | 2012106520 A | 9/2013 |
| RU | 142948 U1 | 7/2014 |
| RU | 2563975 C1 | 9/2015 |
| WO | 2005021810 A1 | 3/2005 |

OTHER PUBLICATIONS

Krasilnikov et al., Progress with the ITER Project Activity in Russia, Nuclear Fusion, 55, 104007, Feb. 2015, 11 pages.
Poddubnyi et al., Electrical Connectors for Blanket Modules in ITER, Fusion Engineering and Design vol. 89 (2014), Feb. 2014, pp. 1336-1340.
Written Opinion of the International Searching Authority, dated May 25, 2017, in corresponding International Application No. PCT/RU2017/000022, 7 pages, with English Translation.
International Preliminary Report on Patentability, dated Aug. 7, 2018 issued in International Application No. PCT/RU2017/000022, 5 pages.
International Search Report (with English Translation), dated May 25, 2017, in corresponding International Application No. PCT/RU2017/000022, 3 pages.
International Atomic Energy Agency (MAGATE), Vienna, 2002 ITER Technical Basis, ITER EDA Documentation series No. 24, Plant Description Document, Chapter 2.3, p. 105—2.3A.3 Electrical Connection, Figure 2.3, 4-4 One Strap of the Electrical Connection, 816 pages.

* cited by examiner

ELECTRICAL CONNECTION OF ELEMENTS INSIDE THE CHAMBER OF A NUCLEAR FUSION REACTOR TO THE REACTOR VESSEL

CROSS-REFERENCE TO RELATED APPLICATIONS

This application is a National Stage of PCT/RU2017/000022, filed Jan. 19, 2017 that claims the priority of Russian Patent Application No. 2016103210, filed on Feb. 1, 2016, which are incorporated herein by reference in their entirety for all purposes.

TECHNICAL FIELD

The invention relates to the field of thermonuclear fusion and can be used in devices for electrically connecting internal elements of the reactor chamber to the vacuum vessel of the nuclear fusion reactor.

BACKGROUND OF THE INVENTION

There is known a device for electrical connection of reactor chamber internal elements to the vacuum vessel of the nuclear fusion reactor, comprising conductive elements with surface portions oriented in different directions, which are stacked between flanges. Conductive elements of the known device comprise flattened tubes having a slotted cavity sealingly closed by a welded or brazed seam (Russian Patent No. 118100, IPC G21B1/17, published on Oct. 7, 2012).

The known device has a disadvantage that a disruption of the electric connection is possible between the reactor chamber internal element and the vacuum vessel of the reactor under alternating ponderomotive forces and thermal gradients generated during reactor operation, resulted from the limited cyclical strength of the conductive elements caused by local clusters of deformation ranges in the connection points between the conductive elements and the flange parts and at the transition areas of the surface portions of the conductive elements which are oriented in different directions.

The closest analog to the claimed invention, as to the essential features, is a device comprising lamellar conductive elements with surface portions oriented in different directions, the elements stacked between flanges (International Atomic Energy Agency (IAEA), Vienna, 2002 ITER TECHNICAL BASIS, ITER EDA Documentation series No. 24, Plant Description Document, Chapter 2.3, Page 10-2.3.4.3 Electrical Connection, FIG. 2.3.4-4 One Strap of the Electrical Connection).

The known device is comprised of a number of separate parts, such as two flanges and two U-shaped straps, each of them being a lamellar conductive element. The straps are enclosed one inside the other thus forming a single U-shaped package. The separate parts of the device should be manufactured and assembled with a high degree of accuracy for compensation of electromagnetic forces acting on the conductive elements during the reactor operation. Due to the joint resistance between the outside and the inside straps the current mainly flows through the outside straps, resulting in the increased loads on the outside strap and reducing device overall output capacity. Furthermore, a great deformation range arises at the connection points of the conductive elements with the flange parts and at the transition areas of the differently oriented surfaces of the conductive elements during the reactor operation, which may result in a cracking or a collapse of the conductive element.

The known apparatus has a disadvantage that a disruption of the electric connection is possible between the reactor chamber internal element and the vacuum vessel of the reactor, under alternating ponderomotive forces and thermal gradients generated during reactor operation, resulted from the limited cyclical strength of the conductive elements caused by local clusters of deformations in the connection points of the conductive elements with the flange parts and at the transition areas of the surface portions of the conductive elements, which are oriented in different directions. Furthermore, the known apparatus has a disadvantage that providing accuracy of the manufactured parts and their assembling is quite challenging since fitting gaps should be kept at the lowest level.

SUMMARY OF THE INVENTION

The object of the present invention is providing a device for electrical connection of the reactor chamber internal elements to the vacuum vessel of the nuclear fusion reactor, which allows to increase the reliability of electrical connection between the reactor chamber internal element and the vacuum vessel of the reactor and thus to ensure the reliable operation of the fusion reactor as a whole.

The technical effect of the present invention is an increase of cyclical strength of the conductive elements at the transition areas from the elements to the flanges and between the surface portions oriented in different directions (at bending points) of the elements, as well as providing similarity in specifications of the conductive elements.

The technical effect indicated above is achieved by means of modification of the known device described above and designed for electrical connection of the reactor chamber internal elements with the vacuum vessel of the nuclear fusion reactor, the device comprising lamellar electrically conductive elements having the surface portions oriented in different directions, the elements being stacked between flanges. This device is made, according to the present invention, as an integral unit having profiled slots with connecting walls therebetween, wherein the connecting walls constitute the conductive elements and have profiled sections of an increased thickness between the surface portions oriented in different directions and at transition areas to the flanges provided at the end parts of the integral unit.

In addition, the device according to the present invention is made by means of electric erosion machining or by hydro-abrasive treatment of a single blank part comprised of the high-electroconductive alloy.

Manufacturing the device as an integral unit from a single blank part ensures similar technical characteristics of the conductive elements, and also minimizes the manufacturing and control operations, which, aside from increasing reliability of the device and the whole reactor, results in reducing manufacturing costs of the device. Making the conductive elements integral in a form of profiled connecting walls having increased thickness at the points of highest deformation (at the transition areas to the flanges and between the surface portions oriented in different directions) ensures a certain level of cyclical strength of the conductive elements under the predefined suppleness and with minimal dimensions, resulting in increase of the operational life of the whole device, i.e. increase in reliability of the electrical connection between the reactor chamber internal element and the vacuum vessel of the nuclear fusion reactor. The end parts of the integral unit being the flanges of the device have uniform contact surfaces, which significantly reduces electrical resistance in the contact zones between the reactor chamber internal element and the reactor vacuum vessel, thus decreasing heating of these zones by the current flow (especially at extreme values), also aiding in increase of operational life of the device for electrical connection of the reactor chamber internal elements with the vacuum vessel of the nuclear fusion reactor.

BRIEF DESCRIPTION OF THE DRAWINGS

The preferred embodiment of the present invention is described herein. The device for electrical connection of the reactor chamber internal elements with the vacuum vessel of the nuclear fusion reactor comprises two flanges 1, 2 and lamellar conductive ribbon-like elements 3 having portions 6 of their surfaces oriented in different directions, the conductive elements 3 being stacked between the flanges. The device is made as an integral unit from a single blank part of a high-electroconductive alloy (for example, copper or 1% chromium dopped copper alloy). In the central section of the integral unit the profiled slots 3a are formed by the means of electric erosion machining or using hydro-abrasive treatment, wherein the connecting walls between the slots connect the end parts of the integral unit. The connecting walls constitute the conductive elements, and the end parts of the integral unit comprise the flanges 1 and 2, respectively. The connecting walls are of an undulate shape and have profiled sections of an increased thickness at the points of the highest deformation (at the transitions 8 to the flanges 1 and 2 and at the bends or bights 7 between the portions 6 of the surface which are oriented in different directions). The number and the shape of the walls can vary depending on the desired values of suppleness and current load capacity of the device. The device is fixed to the internal chamber component 4 through the flange 2 and is fixed to the vacuum vessel 5 through the flange 1.

DETAILED DESCRIPTION

Figure 1:
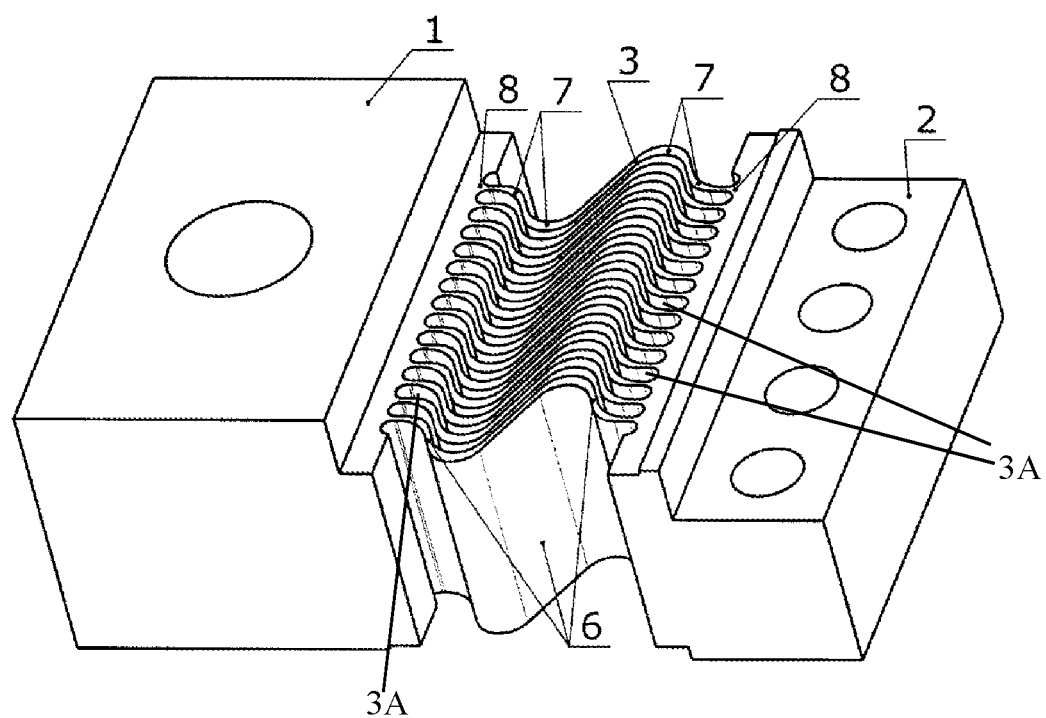
FIG. 1 is the isometric view of the device for electrical connection of the reactor chamber internal elements with the vacuum vessel of the nuclear fusion reactor, according to the present invention.
Figure 2:
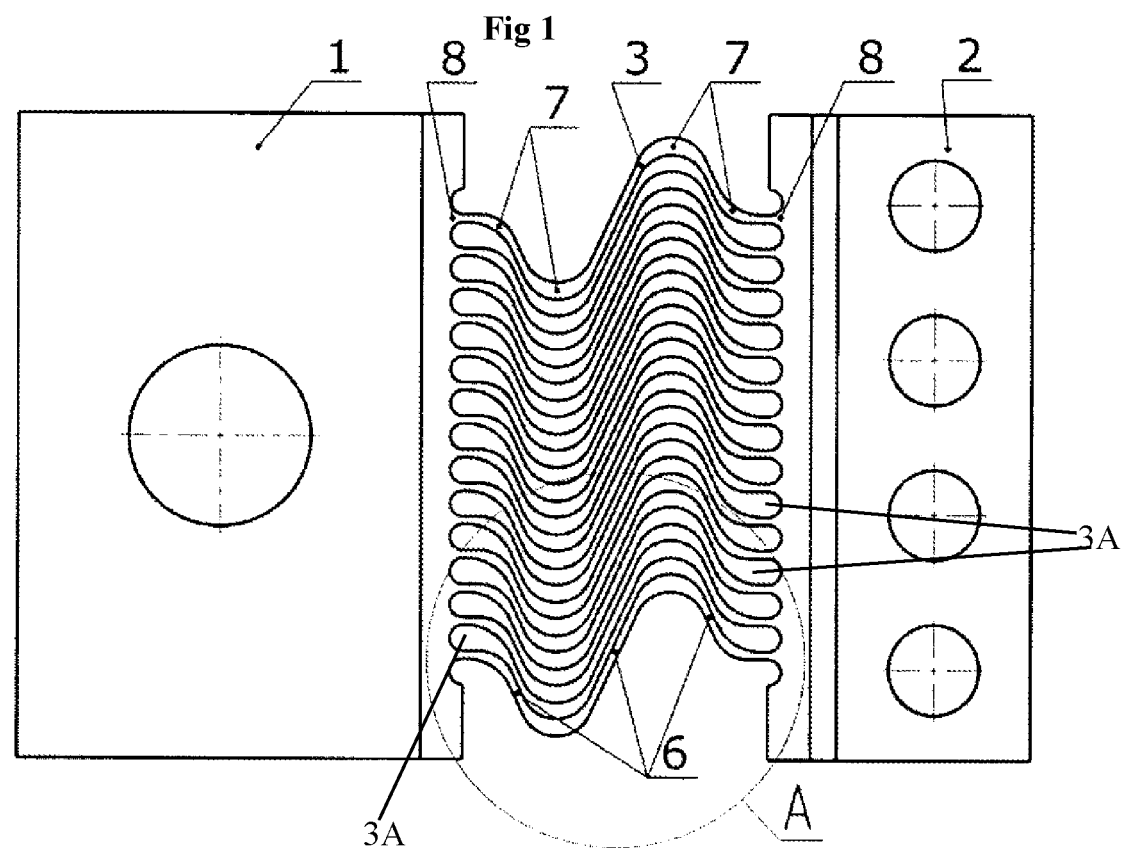
FIG. 2 is the sectional side view of the device for electrical connection of the reactor chamber internal elements with the vacuum vessel of the nuclear fusion reactor, according to the present invention.
Figure 3:
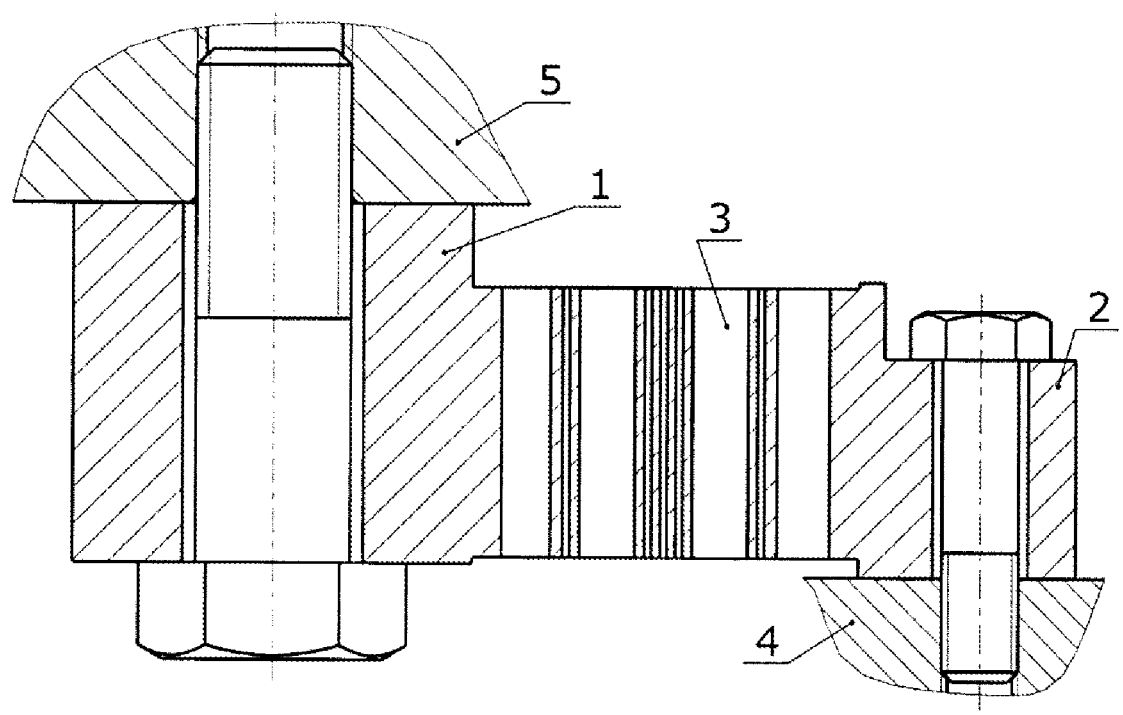
FIG. 3 is the top view of the device of FIGS. 1 and 2, according to the present invention.
Figure 4:
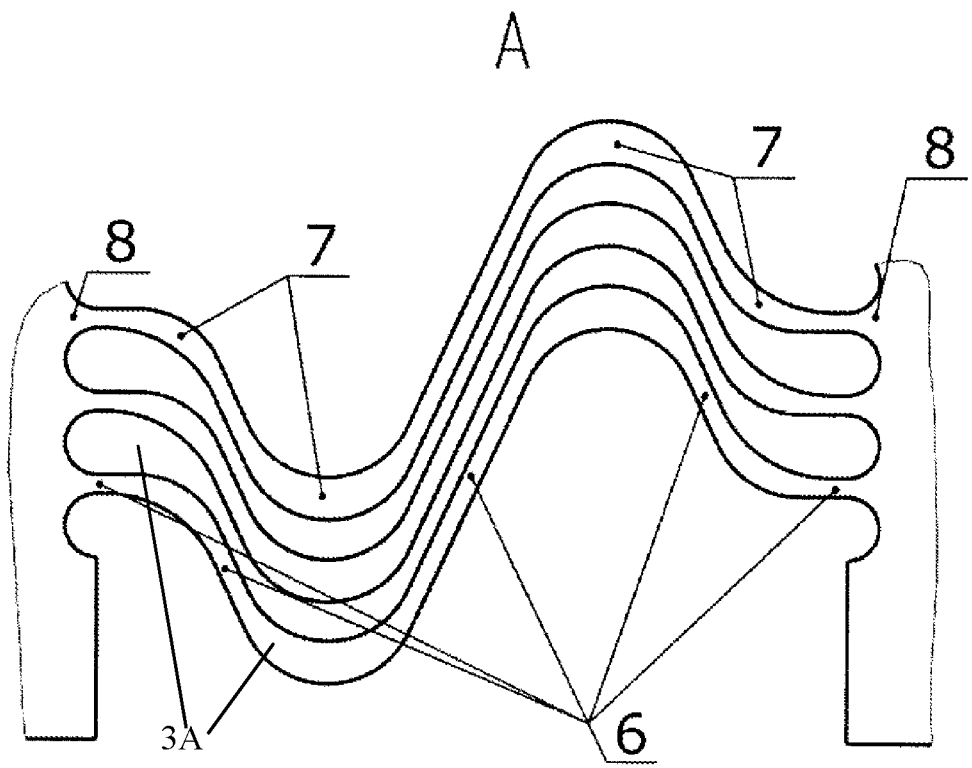
FIG. 4 is an enlarged view of section A shown in FIG. 2.

The preferred embodiment of the present invention is described herein. The device for electrical connection of the reactor chamber internal elements with the vacuum vessel of the nuclear fusion reactor comprises two flanges 1, 2 and lamellar conductive elements 3 having portions of the surface oriented in different directions, the conductive elements 3 being stacked between the flanges. The device is made as an integral unit from a single blank part of a high-electroconductive alloy (for example, copper or 1% chromium dopped copper alloy). In the central section of the integral unit the profiled slots are formed by the means of electric erosion machining or using hydro-abrasive treatment, wherein the connecting walls between the slots connect the end parts of the integral unit. The connecting walls constitute the conductive elements, and the end parts of the integral unit comprise the flanges 1 and 2, respectively. The connecting walls are of an undulate shape and have profiled sections of an increased thickness at the points of the highest deformation (at the transitions to the flanges 1 and 2 and between the portions of the surface which are oriented in different directions). The number and the shape of the walls can vary depending on the desired values of suppleness and current load capacity of the device. The device is fixed to the internal chamber component 4 through the flange 2 and is fixed to the vacuum vessel 5 through the flange 1.

The device is operated as follows.

When plasma current brakes down it is necessary to divert the heavy current causing ponderomotive forces in the device from the fusion reactor chamber internal component 4 to the vacuum tank 5. The current flows from the reactor chamber internal component 4 to the device through the flange 2, and then to the flange 1 via the device through the conductive elements 3 (connecting walls). The current flows from the device to the vacuum vessel 5 of the nuclear fusion reactor through the flange 1.

The invention claimed is:

1. A device for electrical connection of internal elements of a reactor chamber to a vacuum vessel in a nuclear fusion reactor comprising:
   a pair of flanges, and
   a plurality of lamellar electrically conductive elements disposed in lamellae between the flanges;
   wherein,
      the conductive elements and the flanges are a single continuous integral unit,
      each electrically conductive element has an undulate shape and includes bends between surface portions with differently directed normals,
      the plurality of electrically conductive elements are arranged in layers between the flanges, and
      each electrically conductive element has thickenings at the bends between the surface portions with differently directed normals and at transition areas where the electrically conductive elements transition to the flanges.

2. The device of claim 1, wherein the device is made from a single blank of an electroconductive alloy.

3. The device of claim 2, wherein the electrically conductive elements are formed by making profiled slots in a central section of the single blank by electric erosion machining.

4. The device of claim 2, wherein the electrically conductive elements are formed by making profiled slots in a central section of the single blank by hydro-abrasive treatment.

* * * * *